United States Patent [19]
Kamon et al.

[11] Patent Number: 5,726,645
[45] Date of Patent: Mar. 10, 1998

[54] REMOTE CONTROLLER CAPABLE OF SELECTING AND SETTING PRESET DATA

[75] Inventors: Yoshiyuki Kamon, Kanagawa; Iwao Takiguchi, Chiba; Toshiyuki Takahashi, Kanagawa, all of Japan

[73] Assignee: Sony Corporation, Japan

[21] Appl. No.: 735,419

[22] Filed: Oct. 22, 1996

Related U.S. Application Data

[63] Continuation of Ser. No. 309,684, Sep. 21, 1994, abandoned.

[30] Foreign Application Priority Data

Sep. 28, 1993 [JP] Japan .................................. 5-263090

[51] Int. Cl.⁶ .................................................. H04B 1/20
[52] U.S. Cl. .................. 340/825.22; 340/825.56; 340/825.69; 340/825.72; 359/146; 359/148; 359/157
[58] Field of Search .................... 340/825.22, 825.37, 340/825.56, 825.69, 825.72; 348/734; 359/142, 143, 146, 148, 157

[56] References Cited

U.S. PATENT DOCUMENTS

| | | | |
|---|---|---|---|
| 4,549,179 | 10/1985 | Stendardo | 340/825.69 |
| 4,703,359 | 10/1987 | Rumbolt et al. | 340/825.69 |
| 4,712,105 | 12/1987 | Köhler | 340/825.69 |
| 4,728,949 | 3/1988 | Platte et al. | 340/825.37 |
| 4,746,919 | 5/1988 | Reitmeier | 340/825.56 |
| 4,764,981 | 8/1988 | Miyahara et al. | 340/825.69 |
| 4,825,209 | 4/1989 | Sasaki et al. | 340/825.72 |
| 4,897,718 | 1/1990 | Testin et al. | 340/825.69 |
| 5,128,667 | 7/1992 | Enomoto et al. | 340/825.72 |
| 5,410,326 | 4/1995 | Goldstein | 348/734 |
| 5,485,149 | 1/1996 | Takiguchi et al. | 340/825.69 |
| 5,519,457 | 5/1996 | Nishigaki et al. | 340/825.22 X |

FOREIGN PATENT DOCUMENTS

| | | | |
|---|---|---|---|
| 0577267A1 | 1/1994 | European Pat. Off. | |
| 61-247184 | 11/1986 | Japan | 348/734 |

*Primary Examiner*—Brian Zimmerman
*Assistant Examiner*—William H. Wilson, Jr.
*Attorney, Agent, or Firm*—Ronald P. Kananen

[57] ABSTRACT

A method of presetting is provided, wherein a plurality of command signals associated with a plurality of apparatuses, a plurality of manufacturers, a plurality of format systems and a plurality of control operations are stored in a memory in advance. A detecting circuit is provided for sequentially transmitting predetermined command signals (e.g., a power on command) to an apparatus to be controlled in accordance with the operation in the preset mode to detect the operational mode of the apparatus to be controlled. As a result, the operation of the apparatus to be controlled can be automatically detected, and the type, the manufacturer and the format of the of the apparatus can be identified from the command signal transmitted.

30 Claims, 7 Drawing Sheets

FIG. 2

| NUMBER OF PUSHES / NUMERIC KEY | 1 | 2 | 3 | 4 |
|---|---|---|---|---|
| 1 | A MANUFACTURER $C_{A1}$ | A MANUFACTURER $C_{A2}$ | | |
| 2 | B MANUFACTURER $C_{B1}$ | B MANUFACTURER $C_{B2}$ | B MANUFACTURER $C_{B3}$ | B MANUFACTURER $C_{B4}$ |
| 3 | C MANUFACTURER | | | |
| 4 | D MANUFACTURER | | | |
| 5 | E MANUFACTURER $C_{E1}$ | E MANUFACTURER $C_{E2}$ | | |
| 6 | F MANUFACTURER | | | |
| 7 | G MANUFACTURER | | | |
| 8 | H MANUFACTURER $C_{H1}$ | H MANUFACTURER $C_{H2}$ | H MANUFACTURER $C_{H3}$ | |
| 9 | I MANUFACTURER $C_{I1}$ | I MANUFACTURER $C_{I2}$ | | |
| 10 | J MANUFACTURER | | | |
| 11 | K MANUFACTURER $C_{K1}$ | K MANUFACTURER $C_{K2}$ | | |
| 12 | L MANUFACTURER | | | |

FIG. 3

| PRESET NUMBER | COMMAND SIGNAL GROUP | |
|---|---|---|
| 1 | A MANUFACTURER | CODE $C_{A1}$ |
| 2 | A MANUFACTURER | CODE $C_{A2}$ |
| 3 | A MANUFACTURER | CODE $C_{A3}$ |
| 4 | B MANUFACTURER | CODE $C_{B1}$ |
| 5 | B MANUFACTURER | CODE $C_{B2}$ |
| 6 | B MANUFACTURER | CODE $C_{B3}$ |
| 7 | C MANUFACTURER | CODE $C_{C1}$ |
| 8 | C MANUFACTURER | CODE $C_{C2}$ |
| 9 | D MANUFACTURER | |
| 10 | E MANUFACTURER | |
| 11 | F MANUFACTURER | |
| 12 | G MANUFACTURER | |
| 13 | H MANUFACTURER | |
| 14 | I MANUFACTURER | |
| 15 | J MANUFACTURER | CODE $C_{J1}$ |
| 16 | J MANUFACTURER | CODE $C_{J2}$ |
| 17 | K MANUFACTURER | CODE $C_{K1}$ |
| 18 | K MANUFACTURER | CODE $C_{K2}$ |
| 19 | L MANUFACTURER | |

REMOTE
CONTROLLER

REMOTE CONTROLLER CAPABLE OF SELECTING AND SETTING PRESET DATA

This application is a continuation of application Ser. No. 08/309,684 filed Sep. 21, 1994, now abandoned.

BACKGROUND OF THE INVENTION

1. Field of the Invention

The present invention relates to a remote commander for remote control of an electronic apparatus.

2. Description of the Related Art

Remote commanders which allows remote control of electronic apparatuses such as a television set, stereo set, VTR (video tape recorder) and the like by transmitting command data as command signals having predetermined modulated carrier frequencies using infrared rays or electric waves are well known.

Such command signals are in a variety of formats having different pulse bit cycles and frame structures. Further, various code systems exist for such command signals and they often differ from each other depending on the manufacturers, categories, year of production and types of electronic apparatuses.

Therefore, a remote controller is prepared to be exclusively used for each of various kinds of electronic apparatuses, and a user has to select a remote commander depending on the electronic apparatus to be operated.

In such circumstances, remote commanders which can output command signals in different formats and code systems to be applicable to electronic apparatus from different manufacturers and different models of an apparatus have been developed.

For example, in a prior art remote commander proposed by the applicant and disclosed in U.S. application Ser. No. 074092 now U.S. Pat. No. 5,485,149, groups of command signals corresponding to electronic apparatuses and models of such apparatuses of each of manufacturers (e.g., manufacturers A through L) are stored in a ROM (read only memory) and such command signal groups are normally put in correspondence to a matrix constituted by numeral keys to be used for channel switching and numbers of operations on those keys as shown in FIG. 2.

Further, an arrangement is made so that command signal groups in different format systems (CA1–CK2 in FIG. 2) belonging to a common manufacture correspond to a common numerical key.

A user can select a desired command signal group from among the command signal groups stored in the memory and output it from the remote commander.

The series of operations as described above will be hereinafter referred to as preset selection setting.

According to this operation, for example, a numerical key 2b corresponding to a command signal group in FIG. 2 is pushed in a number of times corresponding to a desired command signal group with a PW (power supply on/off) key 2a held down to specify the command signal group and, thereafter, the PW key 2a is released to enter the command signal group in a RAM (random access memory) to complete the preset selection setting.

A user can make preset selection setting on a command signal group of a code CB3 for the manufacturer B, by pushing the numerical key "2" three times with the PW key 2a held down and by then releasing the PW key 2a.

Thereafter, the remote commander outputs command signals in accordance on operations on control keys from among the command signal group in the code CB3 of the manufacturer B read out from the RAM.

With the above-described configuration of the remote commander the number of command signals groups which are preset is not limited by the number of the control keys although it depends on the capacity of the RAM. Further, since different codes from a common manufacturer corresponds to a common numerical key, a user can easily perform the preset selection setting operation if only the name of the manufacturer is known.

However, in the preset selection setting operation as described above, the numerical key 2b is pushed a required number of times with the PW key 2a held down and, for example, it is sometimes difficult to find the numerical key to be pushed quickly without referring to an attached manufacturer correspondence table or the like.

There are other remote commanders wherein preset selection setting can be made wherein a preset selection setting mode is entered through a predetermined key operation; thereafter, each time a control key for, for example, turning a power supply on or off, sequential channel switching or the like is pushed, a command signal for turning the power supply on or off or a command signal for sequentially switching channels among each of command signal groups stored in a RAM is sequentially transmitted; and, when the power supply of the electronic apparatus receiving such a signal is turned on or off or the channel is switched at the apparatus in response thereto, a predetermined enter operation is carried out by the user with such a reaction monitored.

However, the above-described preset selection setting operation still requires a plurality of key operations, and the user must keep on monitoring whether the state of the electronic apparatus has been changed in accordance with the command signals during such operations. Therefore, a problem remains in that the operation is complicated and bothersome.

SUMMARY OF THE INVENTION

The present invention confronts such a problem and it is an object of the present invention to provide a remote commander which allows a user to select and set a preset command signal group by way of an easy operation involving a minimum number of simple key operations without complicatedness such as in making reference to check the manufacturer of the apparatus used.

In order to achieve the above-described object, there is provided a remote controller for controlling electronic apparatuses so that they perform various operations in accordance with command signals transmitted thereto comprising:

an operation detecting circuit for detecting changes in the operational state of said electronic apparatuses;

a memory in which a first group of command signals for instructing various operations associated with a plurality of manufacturers, a plurality of electronic apparatus and a plurality of format systems are stored in advance;

a plurality of control keys for inputting operations; and a controller for reading out a second group of command signals for instructing predetermined operations associated with a plurality of manufacturers, a plurality of electronic apparatus and a plurality of format systems from the first group of command signals stored in the memory in accordance with an operation on a predetermined control input key among the plurality of control keys, for performing control such that command signals for sequentially instructing predetermined operations at predetermined intervals among the second group of command signals thus read out, for identifying the manufacturer, electronic apparatus and format system based on a detection signal from the operation detecting means, and for setting each of a plurality of command signals for instructing various operations associated with the identified manufacturer, electronic apparatus and format system in correspondence to the plurality of control input keys.

BRIEF DESCRIPTION OF THE DRAWINGS

FIG. 2 illustrates a preset state of command signal groups in a remote commander of the embodiment of the present invention.

FIG. 3 illustrates a preset state of command signal groups which are sequentially transmitted in a preset mode of the embodiment of the present invention.

DESCRIPTION OF THE PREFERRED EMBODIMENT

An embodiment of a remote commander according to the present invention will now be described with reference to FIG. 1 through FIG. 7.

Figure 1:
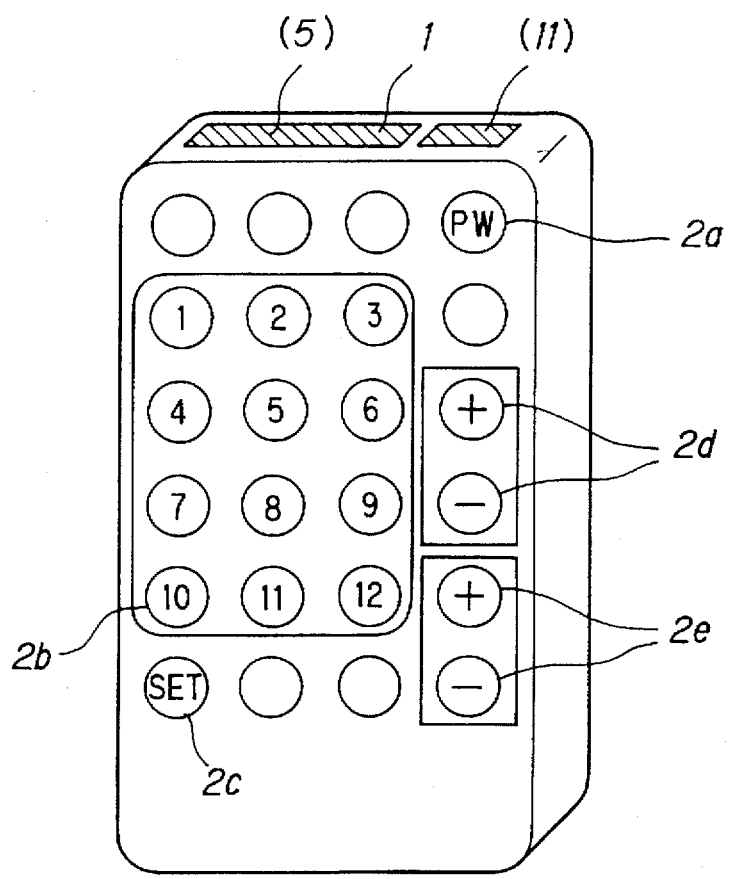
FIG. 1 shows the appearance of a remote commander of an embodiment of the present invention.

FIG. 1 is a perspective view showing an example of the appearance of the remote commander in this embodiment which is an infrared ray remote commander in this case. As shown in FIG. 1, a light emitting portion 1 constituted by an infrared ray emitting element and an infrared ray transmitting filter is provided on the front face thereof.

In the present embodiment, the light emitting portion 1 incorporates a photodiode 5 which provides a learning remote control function to be described later. 11 designates a receiving portion which is provided when an operation detecting portion 10 to be described later is separately provided and is configured so that it transmits detection information by means by infrared rays or electric waves.

A plurality of groups of control keys 2a through 2e on the upper surface of the remote commander. Each of the control keys is associated with an operation on a particular electronic apparatus. For example, the PW key 2a is for turning a power supply on and off; the key group 2b is associated with numerical keys "1" through "12"; the keys 2d are "+" and "−" keys for switching from a channel to another channel assigned a greater or smaller number; the keys 2e are "+" and "−" keys for turning up or down the volume; the keys 2b correspond to the channel keys on a television set.

Further, according to the present embodiment, there is provided a SET key 2c for entering a preset selection setting mode to be described later.

Figure 4:
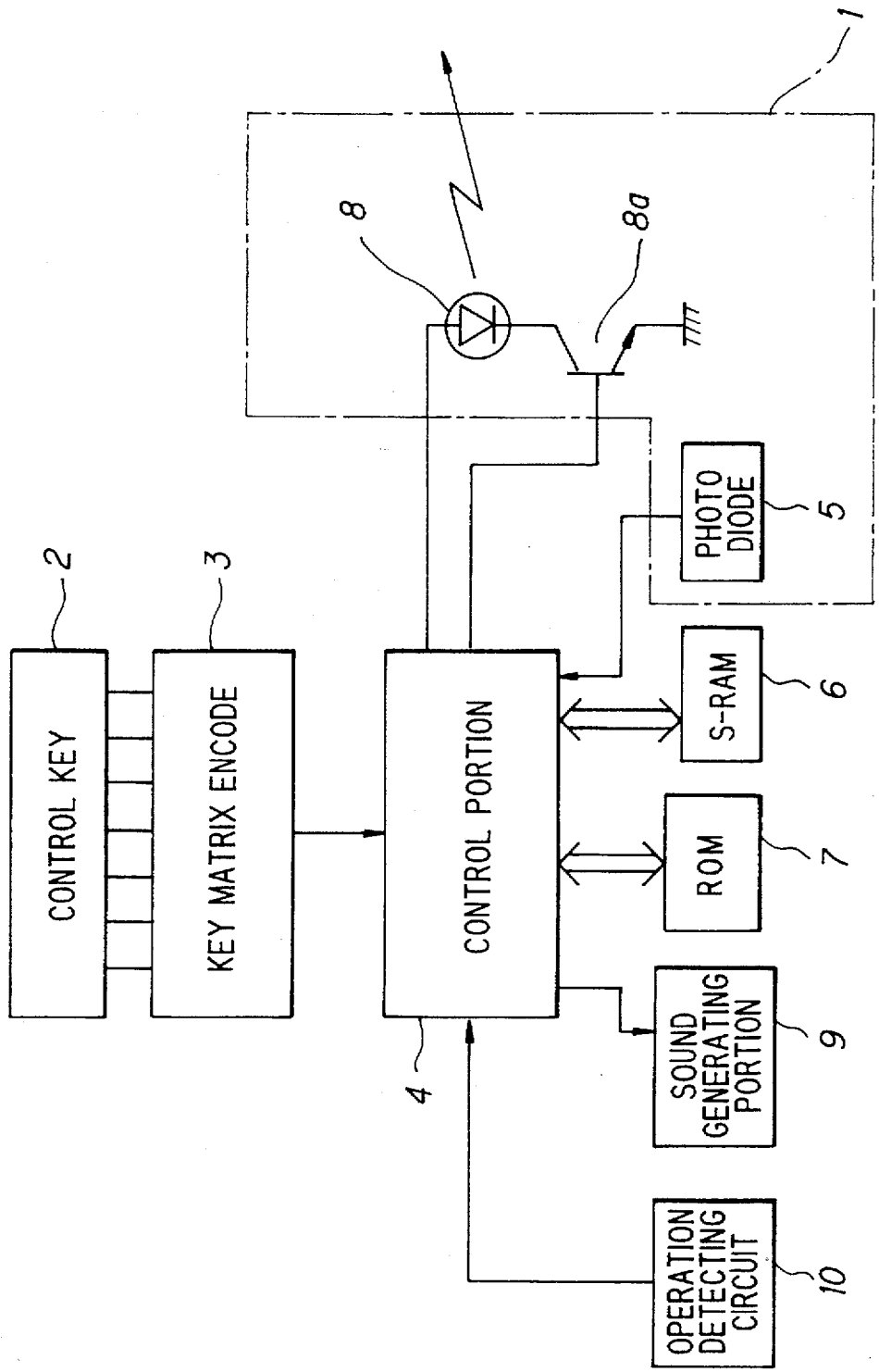
FIG. 4 is an internal block diagram for a remote commander of the embodiment of the present invention.

FIG. 4 is a block diagram showing an example of the configuration of the remote commander in the present embodiment wherein 2 designates control keys provided as shown in FIG. 1; 3 designates a key matrix encoder for outputting information on control input performed by a user in accordance with operations on the control key group 2; and 4 designates a control portion for selecting and outputting command signals based on the control input information supplied the key matrix encoder 3 which is constituted by a microcomputer.

5 designates a photodiode to which, for example, external command signals utilizing infrared rays are input and which is provided along with an infrared ray emitting element in the light emitting portion 1 as previously mentioned in this case; and 6 designates a static RAM for storing the waveform data of command signals from another remote commander which have been input from the photodiode 6 and analyzed by the control portion 4.

For example, if a command signal from another remote commander is transmitted to the light emitting portion 1 (photodiode 5) of remote commander of the this embodiment in accordance with a predetermined operation, this command signal is converted by the control portion 4 into code data which are then stored in the static RAM 6. By repeating such a predetermined operation, command signals of another remote commander can be memorized and, consequently, a plurality of different remote commanders can be functionally consolidated into a single remote commander.

Thereafter, this command signal will be output if a predetermined control key on the remote commander in this embodiment is operated.

7 designates a ROM in which a plurality of command signal groups employing various formats and code systems associated with respective electronic apparatuses categorized according to the manufacturers and types thereof are store in advance as preset data.

Therefore, in this remote commander, once one group of command signals are selected from among the preset data as a result of the execution of a preset data selection and setting operation to be described later, command signals included in the selected group of command signals are output in accordance with operations on control key groups 2a through 2e.

In the light emitting portion 1, 8 designates an infrared ray output portion constituted by a light emitting diode and 8a designates a light emission driving portion. The control portion 4 controls the turning on/off of a switching element (transistor) of the light emission driving portion 8a depending on the command signal to be output (a signal obtained by modulating the command signal by a predetermined carrier) to turn the light emission operation of the infrared ray output portion 8 on and off, thereby outputting the command signal utilizing infrared rays.

9 designates a sound generating portion which is controlled by the control portion 4 so that sounds such as electronic sounds are generated. 10 designates an operation detecting circuit 10 which is provided in the remote commander in the first embodiment and which detects changes in the state of a particular operation of an external electronic apparatus and outputs the information of the detection to the control portion 4.

In the second embodiment, the operation detecting circuit 10 may be provided separately from the remote commander.

Figure 5:
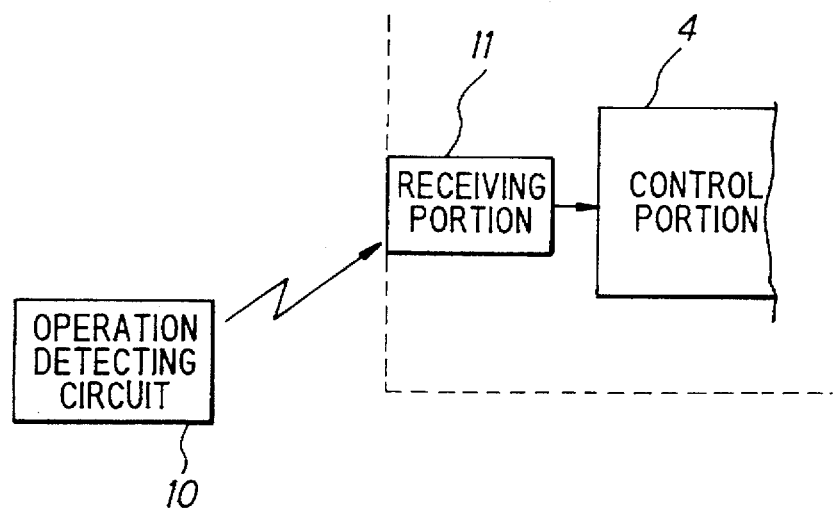
FIG. 5 is a block diagram showing a case wherein an operation detecting circuit is provided separately from a remote commander.

For example, the operation detecting circuits 10 outputs the detection signal by means of infrared rays, electric waves or the like and a receiving portion 11 for receiving the detection signal is provided at the remote commander and the input detection signal is detected by the control portion 4 as shown in FIG. 5.

As an alternative, instead of the radio transmission using infrared rays or electric waves, the operation detecting circuit 10 and the remote commander device may be connected by a cable although not shown.

Figure 6:
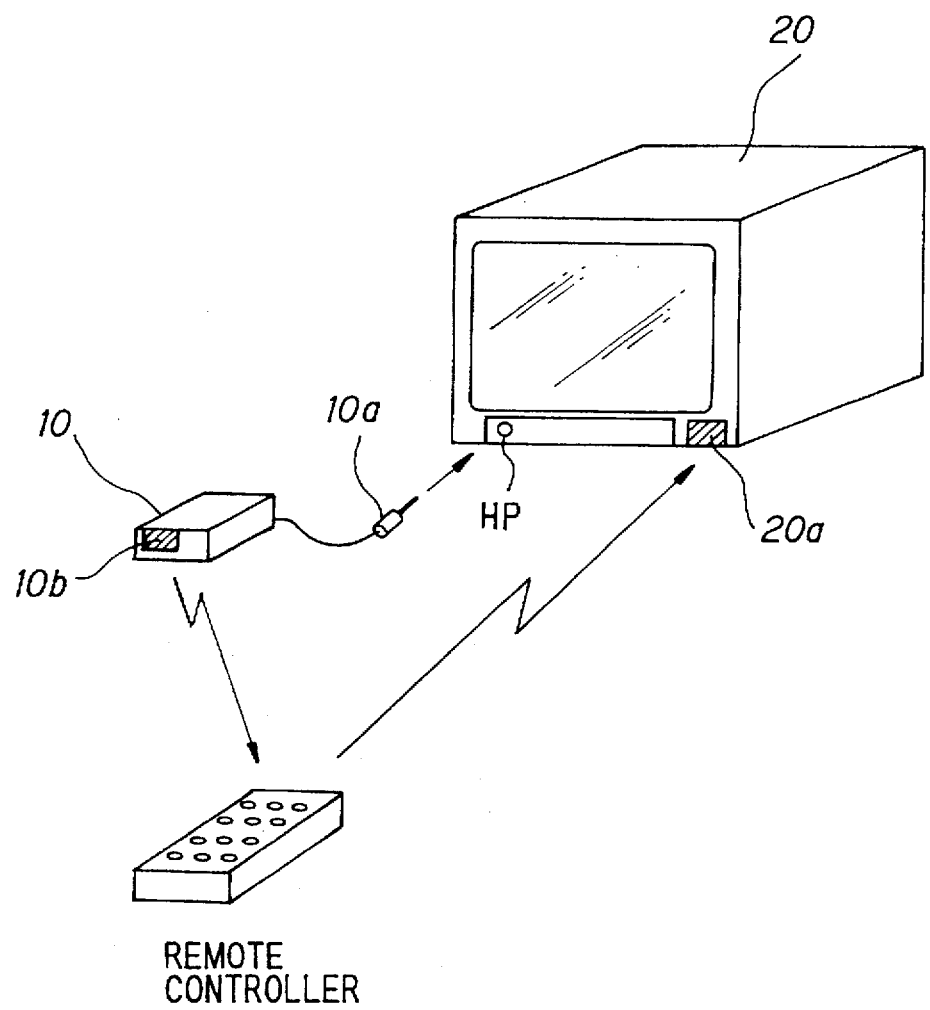
FIG. 6 is a view showing the appearance of the remote commander and the operation detecting circuit in FIG. 5 and an apparatus to be controlled disposed separately from each other.
Figure 7:
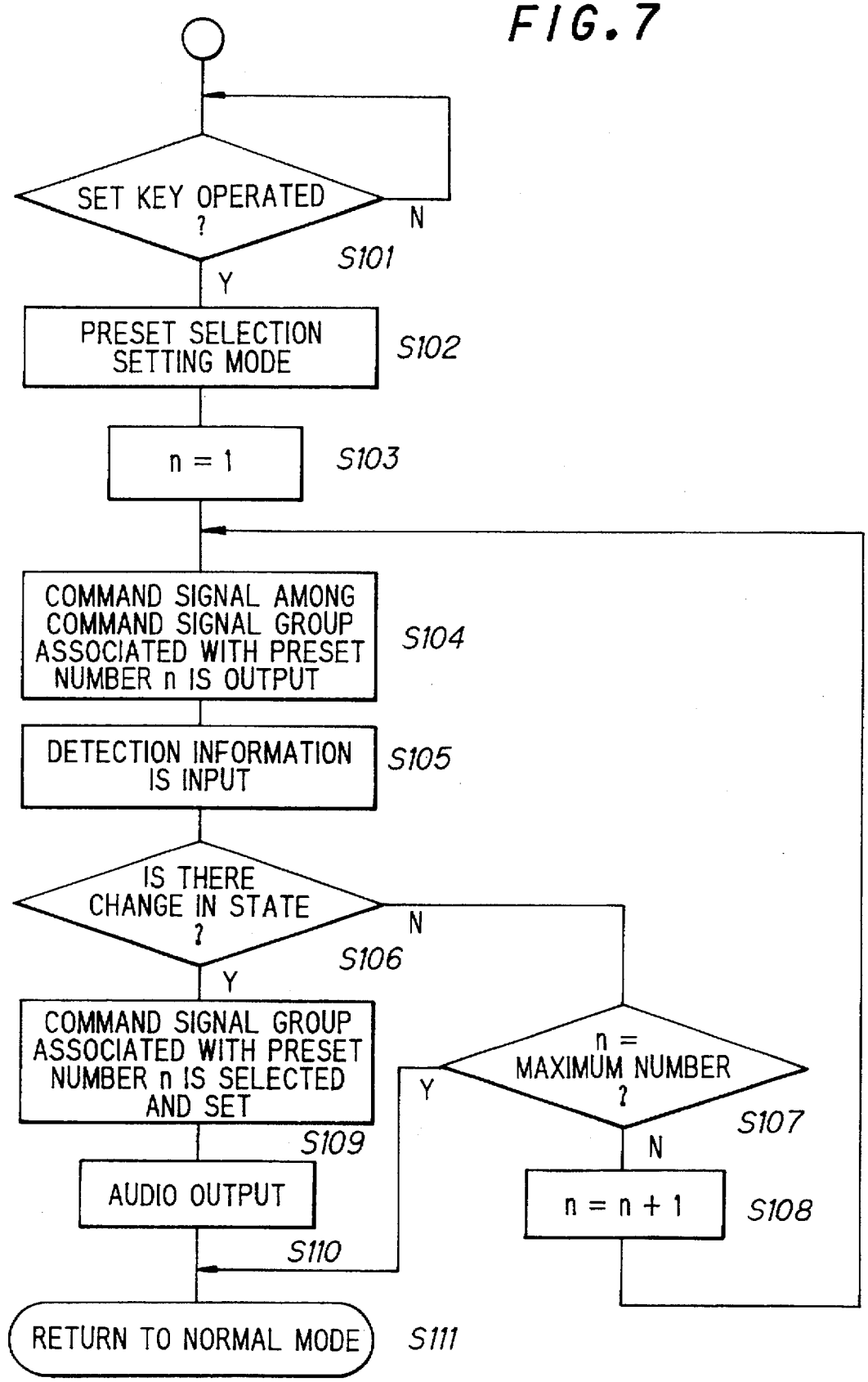
FIG. 7 is a flow chart for a process of selecting and setting a group of command signals according to the embodiment of the present invention.

FIG. 6 illustrates an example of how to use the remote commander in the present embodiment during the preset data selection and setting. In this case, the circuit configuration shown in FIG. 5 wherein the remote commander and the operation detecting circuit 10 are separately provided is employed. The electronic apparatus whose preset data are to be selected and set is a television set 20 in this case.

In this television set 20, 20a designates an infrared ray receiving portion and HP designates a headphone jack.

The operation detecting circuit 10 has a configuration wherein a headphone plug 10a is provided; it is detected whether there is a signal input from the headphone jack or not; and the information of the detection is output from a transmission portion 10b to the remote commander.

An example of the preset data selecting and setting operation will now be described with reference to FIG. 1 and FIG. 6.

First, the user inserts the headphone plug 10a of the operation detecting circuit 10 in the headphone jack HP of the television set 20. This establishes a state wherein audio signals of the television set 20 can be input to the operation detecting portion 10.

The power supply of the television set may be either on or off if the main power supply is on.

If the detection information output means of the operation detecting circuit 10 utilizes infrared rays, the circuit is placed in a position wherein the transmission portion 10b substantially faces the remote commander.

With the above-described arrangements, the user directs the light emitting portion 1 of the remote commander to the infrared ray receiving portion 20a of the television set 20 and pushes the SET key 2c once.

As a result, command signals for turning the power supply on or off belonging to the command signal groups stored in the ROM 7 are sequentially output at constant intervals under control of the control portion 4. The intervals at which the command signals are output may be set considering the speed at which the electronic apparatus responds to particular command signals (signals for turning the power supply on/off in this case), the time for alternate transmissions between the operation detecting circuit 10 and the remote commander and the like.

For example, when the contents of the command signal groups stored in the ROM 7 are as shown in FIG. 3, only the power supply on/off switching command signals included in the command signal groups arranged in association with the preset numbers 1 through 19 are output in the order of the preset numbers.

The correspondence between the command signal groups and the preset numbers may be established in any manner. For example, the command signal groups may be arranged in an outputting order which is determined in accordance with the degrees of spread of those electronic apparatuses.

When the power supply on/off switching command signal belonging to the command signal group associated with the television set 20 is output from the remote commander during the above-described sequential output of the power supply on/off switching command signals, the power supply of the television set 20 is turned off or on depending on the previous state thereof in response to this command signal.

At this time, in accordance to the turning on or off of the power supply, the operation detecting circuit 10 detects the transition from a state wherein some audio signal is being output through the headphone jack HP to a state wherein no sound is output or the opposite transition.

The operation detecting circuit 10 then outputs a detection signal in accordance with such a change in the state. The remote commander regards the command signal group including the most recently output command signal at the point in time when this detection signal is input as associated with the television set 20 and selects and sets this signal.

For example, assume that the state of the power supply of the television set 20 is switched when the power supply on/off switching command signal belonging to the command signal group of the code CJ1 of the manufacturer J corresponding to the preset number 15 in FIG. 3. Then, the operation detecting circuit 10 provides a detection signal indicating the change in the state based on which the remote commander selects and sets the command signal group of the code CJ1 of the manufacturer J.

It is preferable in practical use to have the remote commander output a sound or the like to notify the user that the preset data selection and setting have been performed.

Thereafter, the various command signals belonging to the command signal group (manufacturer J, code CJ1) thus selected and set are output in response to operations on the control key 2, and various kinds of control can be performed over the television set 20 using the remote commander of the present embodiment.

A process performed by the control portion 4 during the preset data setting and selection as described above will now be described with reference to FIG. 1.

First, in order to enter the preset data selecting and setting mode, the control portion 4 waits for the operation on the SET key 2c (S101) and, if it is determined that the SET key 2c has been pushed, proceeds to step S102 to enter the preset data selecting and setting mode wherein it sets a variable n corresponding to the preset numbers for the command signal groups in FIG. 3 as n=1 (S103).

The control portion 4 then proceeds to step S104 to output a predetermined command signal belonging to the command signal group corresponding to the variable n for a predetermined period of time. In this case, since n has been set equal to 1 at step S103, a predetermined command signal belonging to the first command signal group (manufacturer A, code CA1) is output. The predetermined command signal is the power supply on/off signal in the system configuration shown in FIG. 6.

Next, the control portion 4 proceeds to step S105 to enable the input of the detection signal from the operation detecting circuit 10 and then proceeds to step S106.

At this time, the output of subsequent command signals is stopped in order to prevent the mutual transmission and reception between the remote commander and the operation detecting circuit 10 from being interfered.

At step S106, it is determined whether the electronic apparatus (television set 20) has responded to the command signal or not (i.e., whether the turning on or off of the power supply has occurred or not) based on the detection signal from the operation detecting circuit 10. If no, the process proceeds to step S107 to determine whether the variable n is equal to the greatest preset number. For example, if the contents of the ROM 7 are as shown in FIG. 3, this step determines whether the variable n currently equals 19 or not.

If it is determined at this step S107 that the variable n is not equal to the greatest preset number, there are still command signal groups associated with the preset numbers to be output. So, the process proceeds to step S103 to increment the variable n (n=n+1) and then proceeds to step S104.

Therefore, when there is no response from the electronic apparatus against the output of a predetermined command signal belonging to each command signal group, the processes at steps S104 through S107 are repeated to continue the process of sequentially outputting the predetermined command signal belonging to each command signal group in the order of the preset numbers.

On the other hand, in the case that it is determined at step S107 that the variable n is equal to the greatest preset number and the television set 20 has responded to none of the command signals belonging to all the command signal groups stored in the rom 7, the process proceeds to step S111 at which the above-described preset data selection and setting mode is canceled, and the normal operation mode is recovered.

In this case, there is a possibility that the group of command signals associated with the television set 20 has not been stored in the ROM 7 in advance or the television set 20 does not respond for some reason although it has been stored. Such an arrangement to return to the normal operation mode allows the preset data selection and setting to be performed again by operating the SET key 2c.

Although not shown in the flow chart in this figure, when the group of command signals to be preset is not selected and set even though the command signals associated with all the preset numbers have been transmitted and the operation returns to the normal mode as described above, it is preferred to output a beep tone indicating a preset error from the sound generating portion 9. This makes it possible to instruct the user to retry the selecting and setting operation or to allow the user to recognize that the remote commander does not work with the electronic apparatus.

When it is determined at step S106 that there has been a change in the state of the electronic apparatus in the middle of the sequential output of the command signals as described above, the process proceeds to step S109 to select and set the command signal group associated with the present number n. The manufacturer, category and the format system of the electronic apparatus to be controlled can be thus identified. Then, the various control keys on the remote controller are assigned to the command signals associated therewith.

This makes it possible to store various command signals associated with an electronic apparatus owned by a the user in association with the control keys on the remote commander.

Then, the sound generating portion 9 is controlled to output a sound indicating the preset data selecting and setting operation is complete (S110) and the operation returns to the normal mode (S111).

Thereafter, the remote commander can output the command signals belonging to the group of command signals thus selected and set.

As described above, in the remote commander of this embodiment, the process of selecting and setting a group of command signals can be performed in such a manner that the group of command signals associated with the desired electronic apparatus is automatically identified and set once the SET key 2c is first operated to enter the preset data selecting and setting mode without requiring the user to perform key operations and to monitor changes in the state of the electronic apparatus.

Of course, the remote commander of the present invention is not limited to the system configuration shown in FIG. 6, and modifications are possible as long as they have a configuration wherein the remote commander can determine any change in the operation of the electronic apparatus based on the detection signal from the operation detecting portion 10.

For example, the operation detecting portion 10 may be in a configuration such that, in addition to the detecting utilizing a sound as shown in FIG. 6, a capability of detecting a change in voltage during the turning on and off of the power supply is provided by connecting the operation detecting portion 10 between the power supply plug of the electronic apparatus of interest and the plug socket. Further, the operation detecting portion 10 may be connected not only to a headphone terminal but also to a line video output terminal and a line audio output terminal to be capable of detecting changes in the state.

In addition, there may be provided a device capable of detecting a high frequency radiating from an electronic apparatus or an electromagnetic wave radiating from a television set or the like which displays using a CRT to make it possible to output a detection signal based on a change in the state, i.e., the presence or absence of them at the time of turning the power supply on or off. In such a case, a change in the state can be detected even if the operation detecting portion 10 is incorporated in the remote commander, which further improves operability.

While the present invention has been shown and described with reference to the foregoing operational principles and preferred embodiments, it will be apparent to those skilled in the art that other changes in form and detail may be made therein without departing from the spirit and scope of the invention as defined in the appended claims.

What is claimed is:

1. A remote controller for controlling various operations of an electronic apparatus in accordance with command signals transmitted thereto comprising:

an operation detecting means for detecting a change in the operational state of said electronic apparatus;

a memory means in which a first group of command signals for instructing various operations associated with a plurality of manufacturers, a plurality of electronic apparatus and a plurality of format systems are stored in advance;

a plurality of control input means for inputting control; and a control means for reading out a second group of command signals for instructing predetermined operations associated with a plurality of manufacturers, a plurality of electronic apparatuses and a plurality of format systems from the first group of command signals stored in said memory means in accordance with an operation on a predetermined control input means among the plurality of control input means, for performing control such that command signals for instructing a predetermined operation among the second group of command signals thus read out are sequentially transmitted at periodic intervals, for automatically identifying the manufacturer, electronic apparatus and format system based on a detection signal from said operation detecting means, and for setting each of a plurality of command signals for instructing various operations associated with the identified manufacturer, electronic apparatus and format system in association with said plurality of control input means.

2. The remote controller according to claim 1, wherein said command signal for instructing a predetermined operation is a signal for turning a power supply of said electronic apparatus on or off.

3. The remote controller according to claim 2, wherein said operation detecting means detects an audio output of said electronic apparatus.

4. The remote controller according to claim 2, wherein said operation detecting means detects a change in the voltage in said electronic apparatus.

5. The remote controller according to claim 2, wherein said operation detecting means detects a video output of said electronic apparatus.

6. The remote controller according to claim 2, wherein said operation detecting means detects an electromagnetic wave or a high frequency generated by said electronic apparatus.

7. The remote controller according to claim 1, wherein an output interval of said command signal sequentially transmitted at periodic intervals is longer than the sum of the time during which said electronic apparatus responds to the transmitted command signal and the time required for mutual transmission and reception between said remote controller and said operation detecting means.

8. The remote controller according to claim 1, further comprising a sound generating means.

9. The remote controller according to claim 1, wherein said control means cancels a preset mode if no detection signal is obtained from said operation detecting means even after all the command signals belonging to said second group of command signals have been transmitted.

10. A remote control system comprising:
    an electronic apparatus controlled in accordance with command signals transmitted thereto;
    an operation detecting portion for detecting a change in the operational state of said electronic apparatus;
    a memory means in which a first group of command signals for instructing various operations associated with a plurality of manufacturers, a plurality of electronic apparatus and a plurality of format systems are stored in advance;
    a plurality of control input means for inputting control; and
    a remote controller including a control means for reading out a second group of command signals for instructing predetermined operations associated with a plurality of manufacturers, a plurality of electronic apparatuses and a plurality of format systems from the first group of command signals stored in said memory means in accordance with an operation on a predetermined control input means among the plurality of control input means, for performing control such that command signals for instructing a predetermined operation among the second group of command signals thus read out are sequentially transmitted at periodic intervals, for automatically identifying the manufacturer, electronic apparatus and format system based on a detection signal from said operation detecting portion, and for setting each of a plurality of command signals for instructing various operations associated with the identified manufacturer, electronic apparatus and format system in association with said plurality of control input means.

11. The remote control system according to claim 10, wherein said command signal for instructing a predetermined operation is a signal for turning a power supply of said electronic apparatus on or off.

12. The remote control system according to claim 11, wherein said operation detecting portion detects an audio output of said electronic apparatus.

13. The remote control system according to claim 11, wherein said operation detecting portion detects a change in the voltage in said electronic apparatus.

14. The remote control system according to claim 11, wherein said operation detecting portion detects a video output of said electronic apparatus.

15. The remote control system according to claim 11, wherein said operation detecting portion detects an electromagnetic wave or a high frequency generated by said electronic apparatus.

16. The remote control system according to claim 10, wherein an output interval of said command signal sequentially transmitted at periodic intervals is longer than the sum of the time during which said electronic apparatus responds to the transmitted command signal and the time required for mutual transmission and reception between said remote controller and said operation detecting portion.

17. The remote control system according to claim 10, further comprising a sound generating means.

18. The remote control system according to claim 10, wherein said control means cancels a preset mode if no detection signal is obtained from said operation detecting portion even after all the command signals belonging to said second group of command signals have been transmitted.

19. The remote control system according to claim 10, wherein said operation detecting portion is incorporated in said electronic apparatus.

20. The remote control system according to claim 19, wherein said remote controller further comprises a receiving means for receiving a detection signal from said operation detecting portion.

21. The remote control system according to claim 10, wherein said operation detecting portion is incorporated in said remote controller.

22. The remote control system according to claim 10, wherein said remote controller further comprises a receiving means for receiving a detection signal from said operation detecting portion.

23. A method of presetting a remote controller wherein command signals instructing various operations associated with a particular manufacturer, a particular electronic apparatus and a particular format system are selected and set from among a first group of command signals for instructing various operations associated with a plurality of manufacturers, a plurality of electronic apparatuses and a plurality of format systems in association with a plurality of control input means comprising steps of:
    performing comparison to check whether a preset mode has been selected or not;
    sequentially transmitting a command signal at periodic intervals from among a second group of command signals for instructing particular operations associated with a plurality of manufacturers, a plurality of electronic apparatuses and a plurality of format systems if it is determined at said step that the preset mode has been selected;
    determining the state of the operation of an electronic apparatus; and
    automatically setting command signals for instructing various operations associated with each of a plurality of command signals for instructing various operations associated with a particular manufacturer, a particular electronic apparatus and a particular format system based on the command signal which was being transmitted when a change in the operational state of said electronic apparatus was detected in association with a plurality of control input means.

24. The method of presetting a remote controller according to claim 23, wherein the command signal sequentially transmitted at periodic intervals from among the second group of command signals for instructing particular operations is a signal for turning a power supply of said electronic apparatus on or off.

25. The method of presetting a remote controller according to claim 24, wherein said determination of the operational state is to determine an audio output of said electronic apparatus.

26. The method of presetting a remote controller according to claim 24, wherein said determination of the operational state is to determine a change in the voltage in said electronic apparatus.

27. The method of presetting a remote controller according to claim 24, wherein said determination of the operational state is to determine a video output of said electronic apparatus.

28. The method of presetting a remote controller according to claim 24, wherein said determination of the operational state is to determine an electromagnetic wave or a high frequency generated by said electronic apparatus.

29. The method of presetting a remote controller according to claim 24, wherein an output interval of said command signal sequentially transmitted at periodic intervals is longer than the sum of the time during which said electronic apparatus responds to the transmitted command signal and the time required for mutual transmission and reception between said remote controller and said operation detecting portion.

30. The method of presetting a remote controller according to claim 23, a preset mode is canceled if there is no change in the operational state of said electronic apparatus even after all the command signals belonging to said second group of command signals have been transmitted.

* * * * *